United States Patent [19]
Wood, Jr.

[11] Patent Number: 5,085,424
[45] Date of Patent: Feb. 4, 1992

[54] LAMINATED PLAYING SURFACE

[75] Inventor: Sidney B. Wood, Jr., South Hampton, N.Y.

[73] Assignee: Grandstand International Corp., Woodside, N.Y.

[21] Appl. No.: 562,040

[22] Filed: Aug. 2, 1990

[51] Int. Cl.$^5$ .............................................. E04C 13/00
[52] U.S. Cl. ........................................ 272/3; 106/638; 106/900; 404/27; 428/17; 428/87
[58] Field of Search ....................... 272/3; 404/31-38, 404/27; 106/638, 642, 668, 711, 218, 900; 428/17, 87, 95, 96

[56] References Cited

U.S. PATENT DOCUMENTS

| | | | |
|---|---|---|---|
| 3,272,098 | 9/1966 | Buchholtz et al. | 272/3 X |
| 3,407,714 | 10/1968 | Henderson | 272/3 |
| 3,418,897 | 12/1968 | Humalainen | 272/3 |
| 3,433,137 | 3/1969 | Henderson | 272/3 |
| 3,446,122 | 5/1969 | Raichle et al. | 272/3 |
| 3,661,687 | 5/1972 | Spinney, Jr. et al. | 272/3 |
| 3,771,787 | 11/1973 | Wood, Jr. | 272/3 |
| 4,462,184 | 7/1984 | Cunningham | 272/3 |

Primary Examiner—Richard E. Chilcot, Jr.
Attorney, Agent, or Firm—Charles J. Brown

[57] ABSTRACT

A laminated playing surface and its method of making wherein a chemically blown polyolefin foam sheet is laminated by an adhesive to a scrim sheet saturated with a stabilizing agent which when heated contracts the lamination so that it can stretch tight between opposed edge portions affixed to the surface of the playing site.

20 Claims, 1 Drawing Sheet

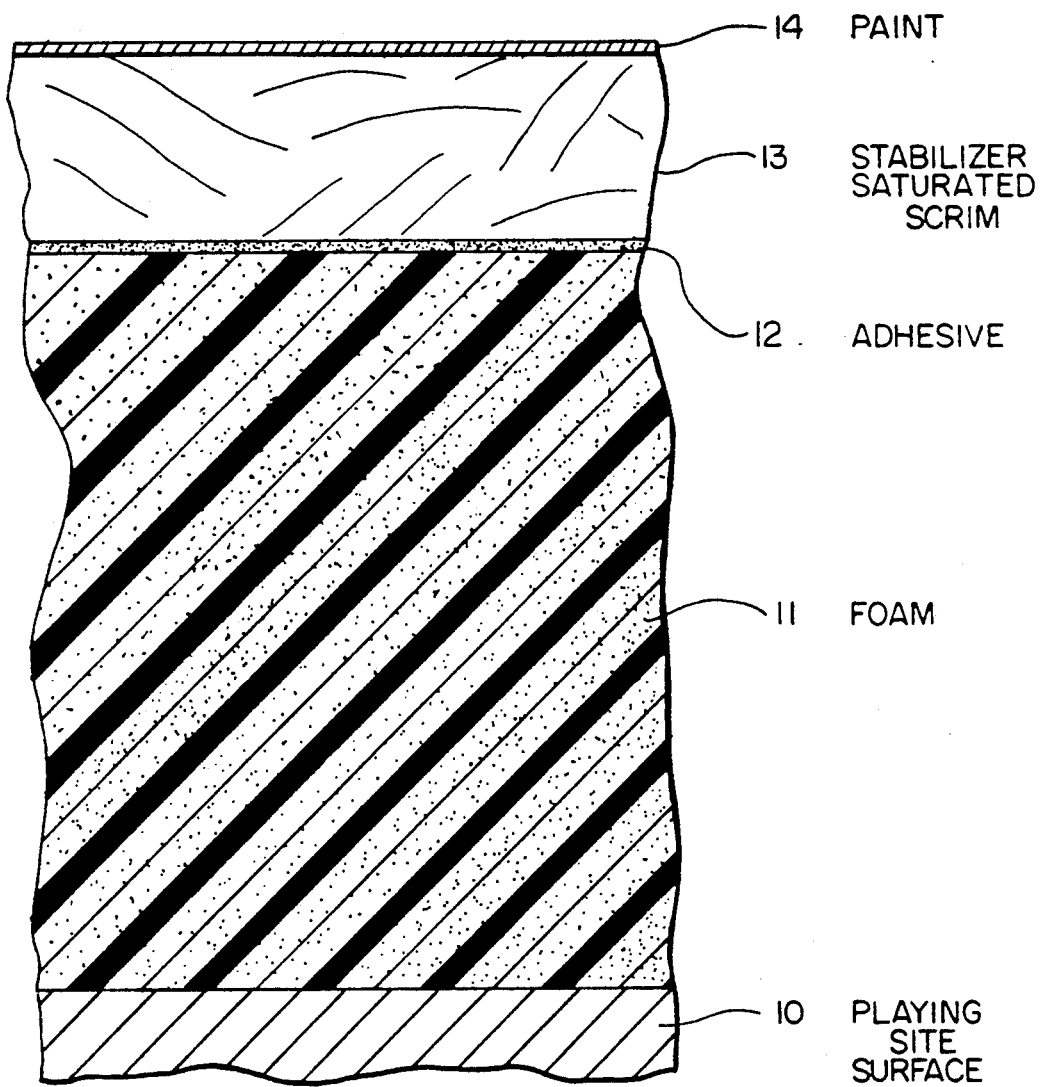

LAMINATED PLAYING SURFACE

BACKGROUND OF THE INVENTION

In my U.S. Pat. No. 3,771,787, I describe a playing surface and its method of making, particularly suitable for tennis, which comprises a foam sheet, for example of closed-cell polyvinylchloride, knife-coated and then heat-laminated to the underside of a felted scrim which may be of polyester fibers. When installed as a permanent playing surface or court, the lamination had to be stretched mechanically across the playing site, for example by a ratchet mechanism or hydraulic jacking device. It also discloses that the playing surface may be formed in a plurality of panels butted and taped together side-by-side.

The principal purpose of the present invention is to improve upon the playing surface described in my aforementioned patent, one form of which has been in commercial use for many years since issuance of my patent. One particular area of improvement is elimination of the need for mechanical stretching to smooth out wrinkles upon installation at the playing site.

SUMMARY OF THE INVENTION

The invention provides a method of making a laminated playing surface which comprises the following sequence of steps: First a chemically blown polyolefin foam sheet is laid flat and covered with an adhesive. A scrim sheet of initially unstabilized non-woven fibers is then laid over the adhesive-covered foam sheet to form a lamination when the adhesive cures. The scrim sheet is saturated with a stabilizing agent capable of causing contraction of the lamination when heated. The exposed surface of the lamination is then painted.

It is preferred that the stabilizing agent first be air-dried without heating, that the lamination be placed flat on the playing site surface with its foam sheet side down and secured at opposed edge portions to the site surface, and that the stabilizing agent then be heated to contract and tighten the lamination. The invention also provides the laminated playing surface itself. It comprises a chemically blown polyolefin foam sheet, one surface of which is covered by an adhesive. A scrim sheet of non-woven fibers is disposed over and laminated to the adhesive-covered foam sheet. A stabilizing agent is provided in the scrim sheet capable of contraction of the lamination when heated. Paint covers that surface of the scrim sheet opposite the foam sheet.

In the preferred form of both the method of making the laminated playing surface and the structure of the laminated playing surface, the polyolefin foam sheet may be one of the group selected from polyvinylchloride and polyethylene. The adhesive is preferably a sprayed-on liquid solvent adhesive which is relatively slow-curing. The fibers of the scrim are preferably of polyester. The stabilizing agent is preferably a styrene-butadiene latex applied to the scrim by a squeegee. The paint is preferably a water-based latex acrylic which can cause further contraction and tightening of the lamination.

The improvement of the invention resides particularly in the automatic tightening of the lamination on the playing site surface without resort to mechanical devices. The stabilizing agent when heated causes the lamination to contract and virtually all wrinkles to be eliminated. The heating of the stabilizing agent can be either by normal solar heating or by artifical hot air blowing.

BRIEF DESCRIPTION OF THE DRAWING

The single drawing is an enlarged fragmentary section showing he laminated playing surface applied to the site surface.

DESCRIPTION OF PREFERRED EMBODIMENT

The method and product of the invention are applicable to many playing surfaces, whether for sports and games or otherwise, but particularly so to tennis courts. Portable court surfaces are contemplated by the invention, which is to say surfaces which are entirely factory made and painted and lined and then taken to the playing site for temporary use followed by removal and reuse. Permanent court surfaces are also contemplated by the invention, factory made in all respects except final painting, and laid out onto the playing surface to remain in place for use indefinitely.

Whether portable or permanent the laminated playing surface of the invention for use in tennis is preferably made in five panels, each of one-hundred and fifty inches wide. The panels are overlapped side-by-side, cut together, their edges abutted and then spanned on the top by tape adhered in place with a latex adhesive.

In indoor use the underlying playing site surface may be of wood, vinyl tile, paving, clay or even an older artificial surface in need of replacement. The underside of the playing surface of the invention for indoor portable use should have a high coefficient of friction so that it will stay in place during play without means positively securing it to the underlying site surface. Outdoors the site surface is more probably asphalt, concrete, clay or even a specially prepared compacted underlayment. The outdoor playing surface should have a resiliency substantially unaffected by temperature changes, not becoming too soft in hotter conditions or too hard in colder conditions.

Referring to the drawing the installed playing surface of the invention, whether portable or permanent, indoor or outdoor, comprises a playing site surface 10 of one of the forms referred to above or any other appropriate form. The laminated playing surface itself in all of its embodiments for all of its applications comprises a foam sheet 11 in surface-to-surface contact with the site surface 10. On the upper surface of the foam sheet 11 is an adhesive layer 12. Laminated to the foam sheet 11 by the adhesive layer 12 is a scrim sheet 13. The upper surface of the scrim sheet 13 is covered by an appropriate layer of paint 14. The entire laminated playing surface comprising the foam 11, adhesive 12, scrim 13 and in some instances the paint 14 is adapted to be factory made, rolled upon an appropriate mandrel and carried to the site in panels as described above for installation.

In the preferred method of the invention an elongated panel of the foam sheet 11, preferably a polyolefin foam, perhaps one-eighth inch thick is rolled out flat on a factory floor. It should be made by the well-known process of chemical blowing which results in a closed-cell foam particularly advantageous in retaining resiliency without deflation and in resisting absorption of moisture. The foam sheet is preferably closed-cell polyethylene for outdoor use because it exhibits relatively constant resiliency not substantially affected by temperature changes. For a portable indoor court not subjected to marked temperature changes the foam sheet 11 may be of closed-cell polyvinylchloride which exhibits a somewhat tacky surface with a high coefficient of friction and therefore remains in place during use without attachment to the playing surface 10, as described in my aforementioned patent.

The next in-factory step is that the adhesive 12 in liquid form is sprayed over the upper exposed surface of the foam sheet 11. The adhesive should act as a mild solvent on the foam sheet 11. For polyethylene foam sheets the preferable adhesive is a non-flammable product sold by the XL Corporation of Calhoun, Ga., U.S.A., under the trademark STIX-95, one ingredient of which is chloroethane. For a polyvinylchloride foam sheet 11 intended to be used indoors and be portable, an ethylene vinyl acetate water-based vinyl adhesive is preferable. Both of these adhesives are relatively slow-curing, which is important so as to allow time for application of the scrim sheet 13 before the previously applied adhesive 11 sets.

That is the next step in the method, which is to say rolling over the adhesive-covered foam sheet 11 the scrim sheet 13 of substantially the same width as the foam sheet 11 and perhaps 0.03 inch thick. The preferred scrim material is polyester fibers which are non-woven and randomly entangled in a snag-needle fashion. It is important that the scrim 13 be in a non-stabilized condition when it is initially applied to the adhesive-covered foam sheet 11. In this state its fibers are not set in a permanent state in a matrix but free to assume different positions. The non-stabilized scrim is self-supporting and can be stretched by pulling and even contracted by compressive forces. With squeegees the scrim sheet 13 is smoothed out over the full expanse of the adhesive-covered foam sheet 11 to eliminate wrinkles, before the adhesive 12 sets. When the adhesive 12 does set a unitary lamination is formed of the foam 11 adhered to the scrim 13 which at that point is still non-stabilized.

The next step is to lay out and construct additional similar laminations of foam and scrim alongside the first in the total amount necessary for the particular playing site. As noted previously a tennis court may require five such panels. Their adjoining edges are very slightly overlapped and then cut together at the overlap so that conforming fresh edges can be butted closely together. These abutting edges are then secured on the top by tape adhered with a latex adhesive such as the styrene-butadiene latex described below for use as a stabilizing agent.

Next the full expanse of the exposed scrim sheet 13 has applied to it by squeegees a coating of a stabilizing agent. Preferably it is a styrene-butadiene resin in a viscous latex form. The stabilizing agent creates a matrix which fixes the fibers of the scrim sheet 13 in a given position so as to provide a durable scuff-resistant and strong playing surface. For reasons noted below it is important that the stabilizing agent also be capable of causing contraction of the lamination of the foam 11 and the scrim 13 when the stabilizing agent is heated. At this point in the factory, however, the stabilizing agent is simply cured by air-drying without heating, one method being to blow ambient air over the saturated scrim sheet surface by means of fans.

If the laminated playing surface is to be used is an indoor court the next step in the factory is to paint its upper surface an appropriate overall color with white lines. A water-based latex acrylic paint is preferred, typically two pre-coats being applied which contain sand and a final coat applied which contains no sand.

A laminated playing surface intended for outdoor use or any non-portable use is not painted in the factory. It is rolled up on a mandrel and transported to the site where it is unrolled to lay flat with the foam sheet 11 facing down. Opposed edge portions of the lamination are then secured to the site surface by mechanical means or by adhesive. All four sides of the playing surface are normally secured in this fashion though in some cases it is only necessary to secure two opposite sides. Once the edges are fastened to the site surface the temperature of the stabilizing agent is increased to at least about 100° F. This may happen automatically be solar heating, but if not hot-air blowers may be located alongside the newly-laid playing surface to provide the heating effect. As the stabilizing agent warms it causes the entire lamination of foam 11 and scrim 13 to contract and thereby tighten itself since its edges are secured. Wrinkling thereby disappears throughout the full expanse of the laminated playing surface.

In this permanent form of playing surface painting of the scrim 13 is then carried out in the same manner as described above for in-factory painting of the portable form of lamination. Typically the darker color utilized for a tennis court acts as a solar heat absorber which further warms the saturated stablizing agent to cause still more contraction and tightening of the lamination.

The scope of the invention is to be determined from the following claims rather than from the foregoing description of the preferred embodiment.

I claim:

1. A method of making a laminated playing surface which comprises
   a) laying flat a chemically blown polyolefin foam sheet,
   b) covering the foam sheet with an adhesive,
   c) laying over the adhesive-covered foam sheet before the adhesive cures a scrim sheet of initially unstabilized non-woven fibers to form a lamination when the adhesive cures,
   d) saturating the scrim sheet with a stabilizing agent capable of causing contraction of the lamination when heated, and
   e) painting the lamination.

2. A method according to claim 1 which prior to painting further comprises
   a) air-drying the stabilizing agent without heating it,
   b) placing the lamination flat on a playing site surface with the foam sheet down,
   c) securing opposed edge portions of the lamination to the site surface, and
   d) heating the stabilizing agent to contract and tighten the lamination.

3. A method according to claim 2 wherein the stabilizing agent is squeegeed over the scrim sheet.

4. A method according to claim 2 where the stabilizing agent is a styrene butadiene latex material.

5. A method according to claim 1 wherein the foam sheet is of polyvinylchloride.

6. A method according to claim 1 wherein the foam sheet is of polyethylene.

7. A method according to claim 1 wherein the adhesive is a liquid applied to the foam sheet by spraying.

8. A method according to claim 7 wherein the liquid adhesive is a solvent and is relatively slow curing.

9. A method according to claim 1 wherein the scrim sheet is smoothed against the foam sheet to substantially eliminate wrinkles before the adhesive cures.

10. A method according to claim 1 wherein the fibers of the scrim sheet are of polyester.

11. A method according to claim 1 wherein the lamination is painted with a water-based latex acrylic paint which causes further contraction of the lamination during drying.

12. A method of making a laminated surface for playing tennis which comprises
   a) laying flat a chemically blown polyolefin foam sheet formed from one of the group consisting of polyvinylchloride and polyethylene,
   b) spraying and covering the foam sheet with a liquid solvent adhesive which is relatively slow curing,
   c) laying over the adhesive-covered foam sheet before the adhesive cures a scrim sheet of initially unstabilized non-woven polyester fibers to form a lamination when the adhesive cures,
   d) smoothing the scrim sheet against the foam sheet before the adhesive cures,
   e) saturating the scrim sheet with a styrene-butadiene latex stabilizing agent capable of causing contraction of the lamination when heated,
   f) air drying the stablizing agent without heating it,
   g) placing the lamination flat on a playing site surface with the foam sheet down,
   h) securing opposed edge portions of the lamination to the site surface,
   i) heating the stabilizing agent to contract and tighten the lamination, and
   j) painting the lamination with a water-based latex acrylic paint which causes further contraction and tightening of the lamination.

13. A laminated playing surface comprising
   a) a chemically blown polyolefin foam sheet,
   b) an adhesive covering one surface of the foam sheet,
   c) a scrim sheet of non-woven fibers disposed over and laminated to the adhesive-covered foam sheet,
   d) a stabilizing agent in said scrim sheet capable of contraction of the lamination when heated, and
   e) paint covering that surface of the scrim sheet opposite the foam sheet.

14. A laminated playing surface installed at a playing site comprising
   a) a chemically blown polyolefin foam sheet,
   b) an adhesive covering one surface of the foam sheet,
   c) a scrim sheet of non-woven fibers disposed over and laminated to the adhesive-covered foam sheet,
   d) a stabilizing agent in said scrim sheet capable of contraction of the lamination when heated, and
   e) said lamination being laid on the playing site with opposed edge portions of the lamination affixed thereto,
   f) said lamination being stretched between the affixed edge portions thereof by contraction resulting from heating of the stabilizing agent, and
   g) said lamination being laid on the playing site with opposed edge portions of the lamination affixed thereto.

15. A laminated playing surface according to claim 14 wherein the foam sheet is formed of one of the group consisting of polyvinylchloride and polyethylene.

16. A laminated playing surface according to claim 14 wherein the adhesive is a slow-curing solvent adhesive.

17. A laminated playing surface according to claim 14 wherein the fibers of the scrim are of polyester.

18. A laminated playing surface according to claim 14 wherein the stabilizing agent is a styrene-butadiene latex material.

19. A laminated playing surface according to claim 14 wherein the paint is a water-based latex acrylic paint.

20. A laminated playing surface installed at a playing site comprising
   a) a chemically blown polyolefin foam sheet formed of one of the group consisting of polyvinylchloride and polyethylene,
   b) a slow-curing solvent adhesive covering one surface of the foam sheet;
   c) a scrim sheet of non-woven polyester fibers disposed over and laminated to the adhesive-covered foam sheet;
   d) a styrene-butadiene latex stabilizing agent in said scrim sheet capable of contraction of the lamination when heated;
   e) said lamination being laid on the playing site with opposed edge portions of the laminations affixed thereto;
   f) said lamination being stretched substantially free of wrinkles by contraction resulting from heating of the stabilizing agent;
   g) a water-based latex acrylic paint covering that surface of the scrim sheet opposite the foam sheet and causing additional contraction and stretching of the lamination.

* * * * *